Jan. 7, 1930.  H. W. BRAINERD  1,742,845
PALLET LAYING DEVICE FOR BRICK MACHINES
Filed Feb. 23, 1927  4 Sheets-Sheet 1
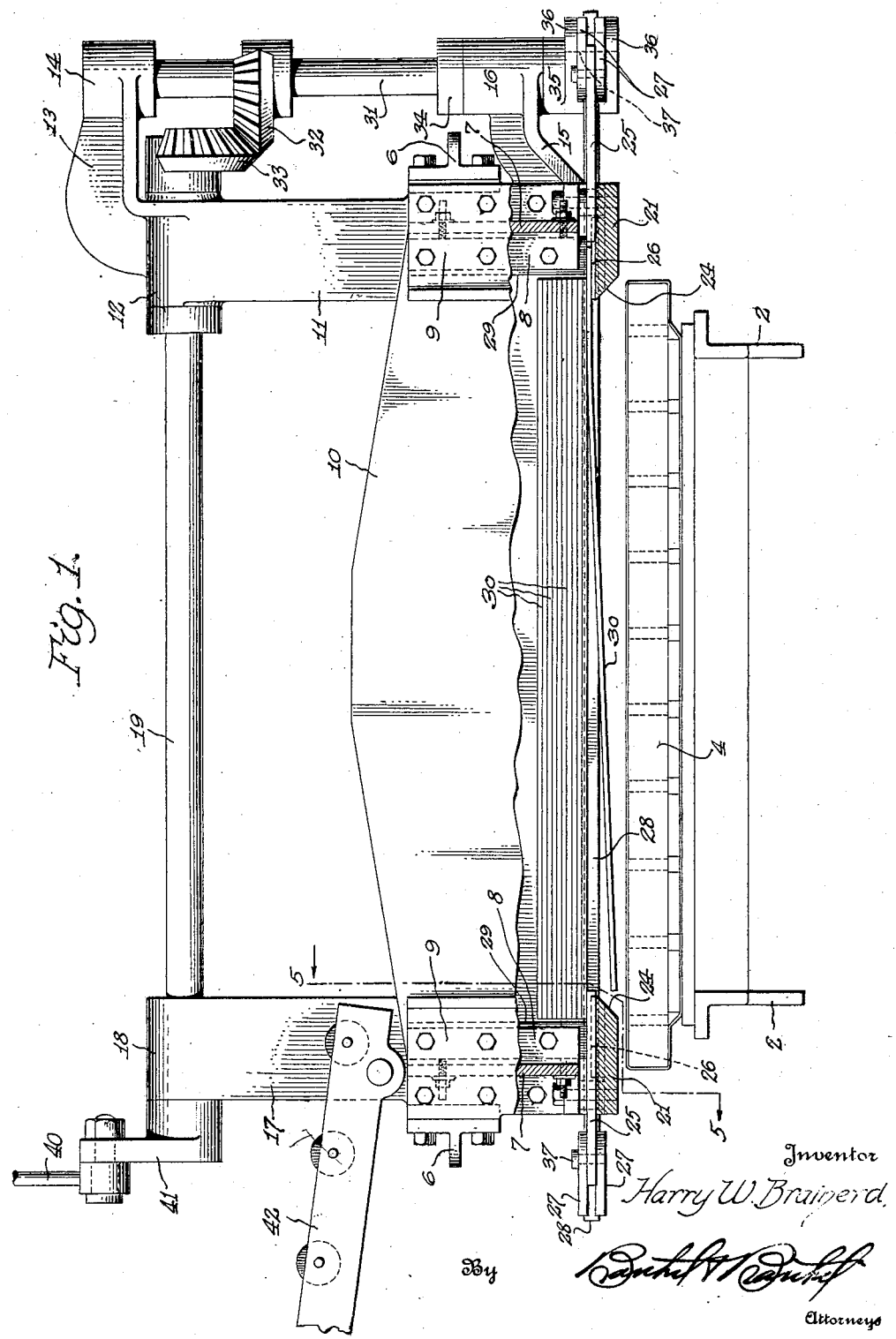

Jan. 7, 1930. H. W. BRAINERD 1,742,845
PALLET LAYING DEVICE FOR BRICK MACHINES
Filed Feb. 23, 1927 4 Sheets-Sheet 2
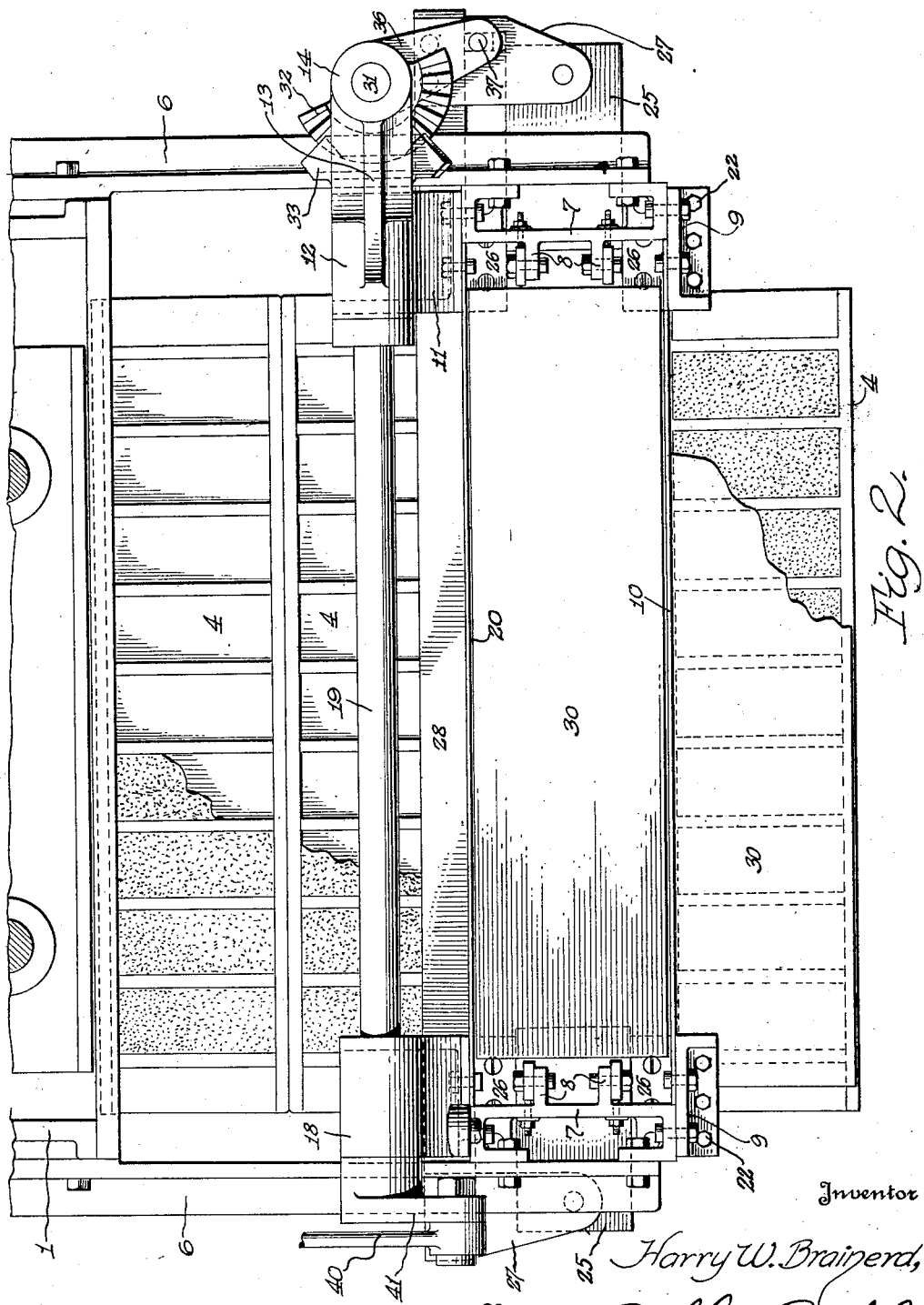

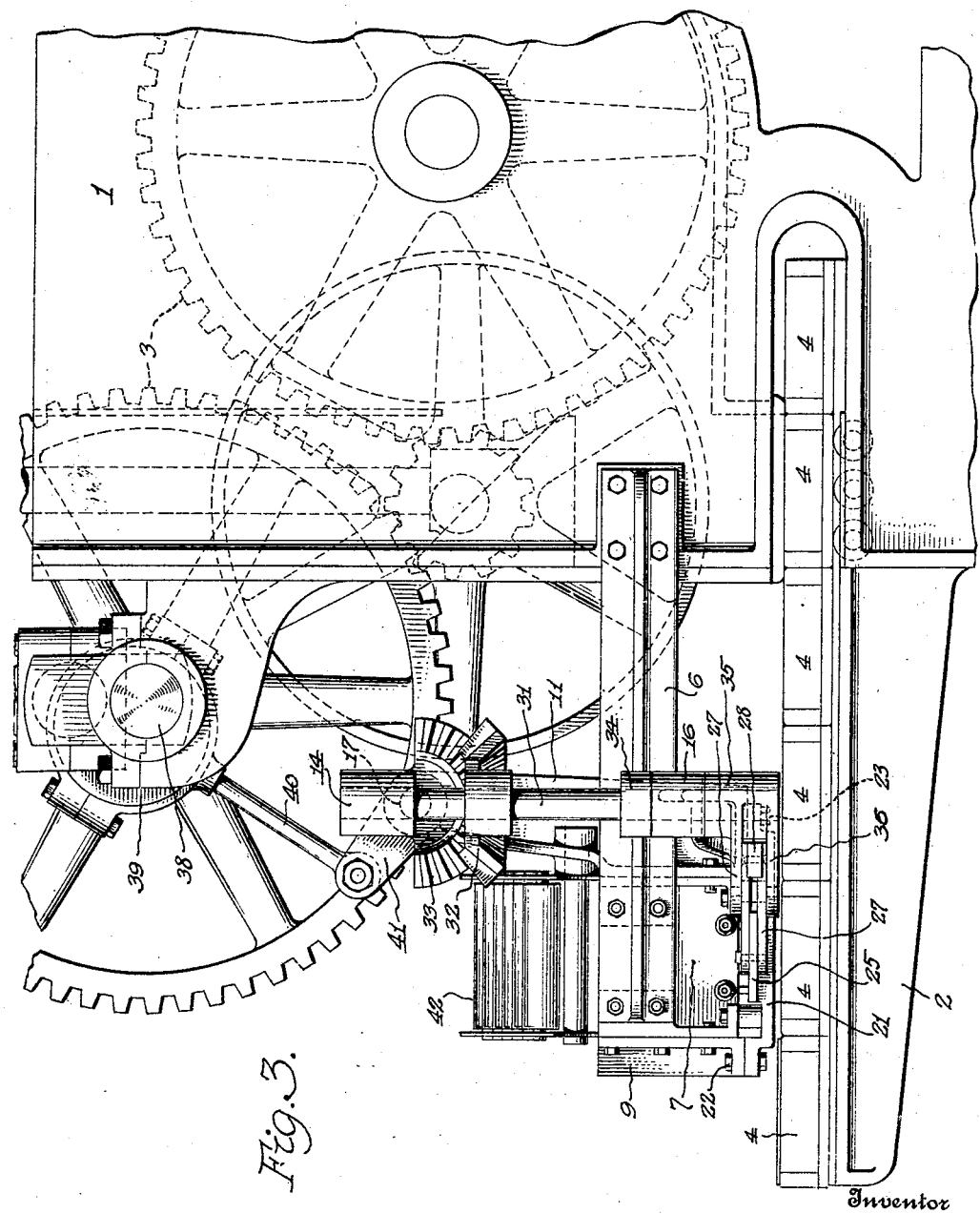

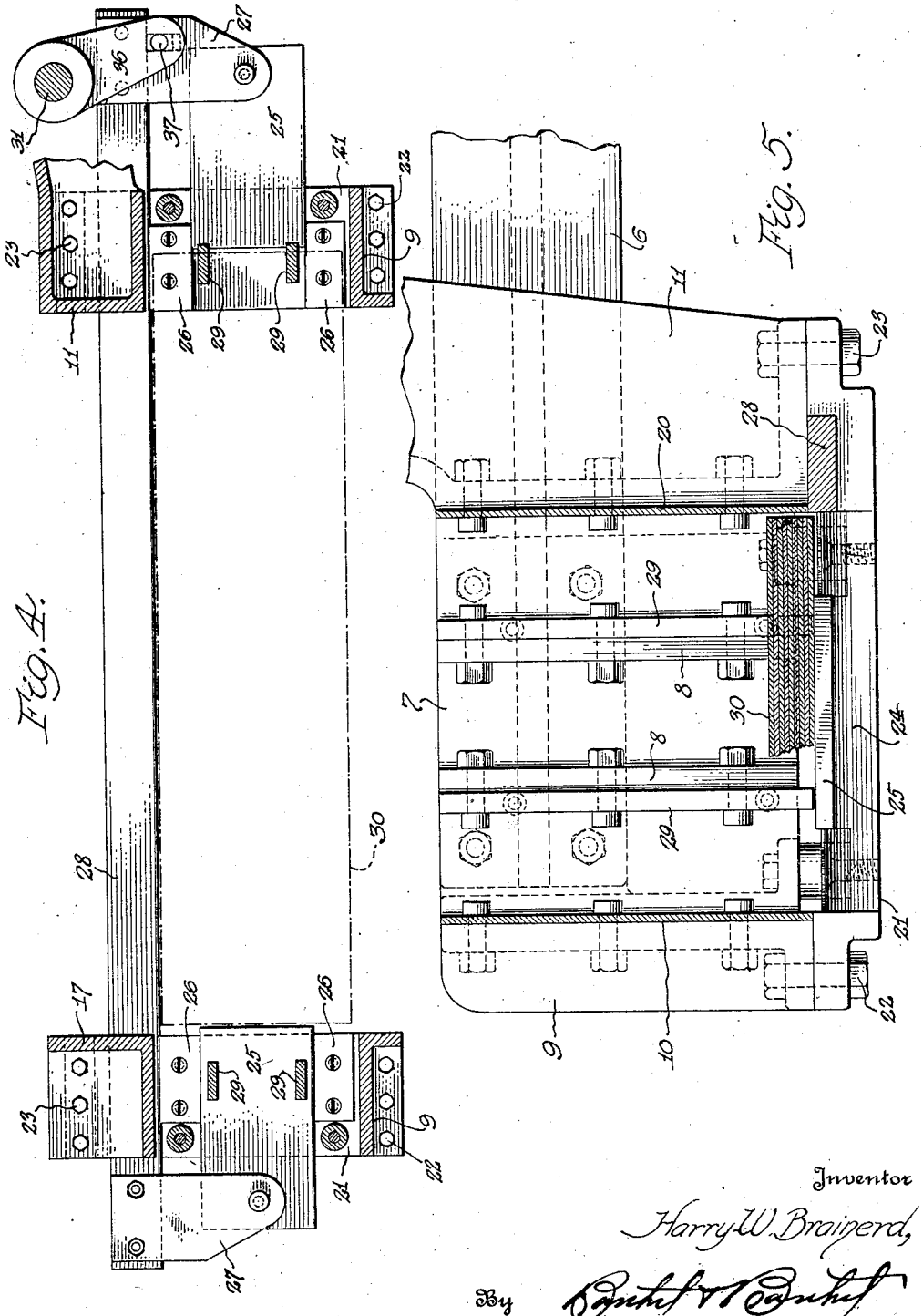

Patented Jan. 7, 1930

1,742,845

UNITED STATES PATENT OFFICE

HARRY W. BRAINERD, OF ADRIAN, MICHIGAN, ASSIGNOR TO W. W. WALLACE, OF CHICAGO, ILLINOIS

PALLET-LAYING DEVICE FOR BRICK MACHINES

Application filed February 23, 1927. Serial No. 170,108.

The present invention pertains to brick machines of the soft mud type wherein a series of brick molds are automatically moved beneath the die of the machine and filled with clay. In usual practice the mold which has been thus filled is covered with a pallet by one or more workmen attending to this job. The mold and pallet are then inverted so that the mold may be stripped off the clay and then returned to the machine for refilling. The pallet with the brick are delivered to the drier, either mechanically or manually.

When the brick machine is running at maximum speed, the manual labor in placing the pallets on the molds often requires more than one man. When the brick are dried and the pallets are returned to the brick machine on a conveyor, one man is required to take them from the conveyor and stack them within reach of a second man who hands them singly to a third man who finally drops them on the brick molds.

The manual labor in this process is considerably reduced by the present invention which provides mechanism for automatically laying the pallets on the molds. In the accomplishment of the object of the invention, spaced supporting bars are provided over the ends of the mold to be covered and are arranged to support a pile of pallets. A suitable ejecting device acts on the ends of the lowermost pallet in such a manner as to release it from the supporting means and thereby allow it to fall upon the mold therebeneath.

The ejecting mechanism, which is preferably in the form of reciprocating slides, is timed according to the movement of molds over the table of the machine. The conveyor running from the drier for the purpose of returning the pallets to the machine may communicate directly with the magazine which is built over the machine to hold the pile of pallets. The only manual operation necessary in operating the device is to take the pallets from the drier and place them on the conveyor.

The invention is fully disclosed in the following description and in the accompanying drawings, in which—

Figure 1 is a front elevation of the machine, partly in section;

Fig. 2 is a plan view;

Fig. 3 is an end view;

Fig. 4 is a horizontal section immediately above the pallet; and

Fig. 5 is a section on the line 5—5 of Figure 1.

Reference to these views will now be made by use of like characters which are employed to designate corresponding parts throughout.

The several figures show and outline a machine of the type adapted to manufacture bricks by the soft mud process and is built upon a frame 1 comprising a table 2 and supporting gearing 3 which operates to press the clay through dies into molds 4 on the table in a manner already well known in the art.

The machine is modified by the application of horizontal bars 6 to the frame thereof and extending adjacent the ends of the table.

To the inner side of each of these bars is bolted a substantially rectangular bracket 7 having a pair of outwardly projecting ribs 8. To the forward edge of each of the members 7 is secured a vertical angle plate 9 as clearly shown in Figures 2, 3 and 5. To the inner faces of the members 9 is fixed a vertical retaining plate 10 extending across the width of the table.

To the rear end of one of the members 7 is bolted an upright member 11 formed at its upper end with a bearing 12 and having a bracket 13 extending therefrom on which is formed another bearing 14 having a vertical axis. An arm 15 extends from the lower portion of the upright 11 and is formed with a bearing 16 having its axis in line with that of the member 14. A similar upright 17 is fixed to the rear end of the remaining member 7 and is formed at its upper end with a bearing 18 having its axis in line with that of the member 12. The bearings 12 and 18 support a shaft 19, the operation and function of which will presently be described.

A plate 20 similar to the member 10 is laid across the table in like manner and is secured to the inner faces of the uprights 11 and 17. Beneath each of the structures assembled on the castings 7 is provided a transverse bar 21 having one end fixed to one of the members 9 by bolts 22, and the rear end fixed to the corresponding upright 11 or 17 by bolts 23, as clearly shown in Figure 5. Between the plates 10 and 20 the inner edges of the bars 21 are beveled as at 24, sloping away from the upper surface thereof as illustrated in Figure 1.

On each of the members 21 is mounted a slide 25 adapted to move at right angles thereto. To the top of each member 21 is secured a pair of spaced steel plates 26 which serve as guides for the slide member and are sufficiently hard to stand the wear caused by the rubbing action. A pair of lugs 27 extend rearwardly from each of the slides and are joined by a bar 28 movable on the rearward portions of the members 21 as shown in Figures 4 and 5. The ribs 8 of the members 7 support vertical bars 29 of hard steel and are positioned so that their lower ends are spaced sufficiently from the slides to conveniently receive one of the pallets 30 resting on the members 21.

The aligned bearings 14 and 16 support a vertical shaft 31 carrying near its upper end a bevel segment 32 meshing with a similar member 33 carried by the shaft 19. The vertical shaft is prevented from slipping by a collar 34 resting on the bearing 16 as shown more clearly in Figure 1. The lower end of the shaft 31 is formed with a boss 35 from which project a pair of ears 36 straddling the adjacent members 27 and secured thereto by a pin 37.

The frame of the machine supports a main shaft 38 on which is mounted an eccentric 39 connected by a link 40 to a crank 41 on the shaft 17. By means of this construction, the rotation of the main shaft 38 causes the countershaft 17 to oscillate, whereby a similar motion is imparted to the shaft 31 through the segments 32 and 33, and the slides 25 are reciprocated in unison by virtue of the bar 28 which joins them together.

In the operation of the device, the molds 4 on the table 2 have been filled with clay in the usual manner and are ready to be covered with the pallets.

This operation is usually performed by hand as already stated. In the present case however, a pile of pallets is laid upon the spaced supporting members 21 directly over the mold to be covered. One of the slides 25 pushes one end of the lowest pallet from the supporting member 21, and this end of the pallet therefore falls towards the mold as clearly illustrated in Figure 1. On the opposite movement of the slides, the remaining slide throws the other end of the pallet off the corresponding member so that the pallet lies entirely on the mold therebeneath. It will be apparent that a pallet will be discharged in this manner at each alternate throw of the slides. The space between the slides and the members 29 is sufficient for the entrance of one pallet therein, but not wide enough to receive two pallets, so that only one pallet at a time will be released from the supporting members. The operation of the slides may obviously be timed with the movement of the molds 4 along the table 2.

The plates 10 in conjunction with the supporting members 21 constitute a magazine for receiving the pallets and maintaining them in more or less accurate superposition. This magazine is replenished by placing the supply of pallets on the sloped roller conveyor 42 secured to the upright 17 and allowing them to drop upon the supporting members 20. These pallets will be guided into the position shown in Figure 1 by the side plates 10 and the end members 29.

Although a specific embodiment of the invention has been illustrated and described, it will be apparent that various alterations in the details of construction may be made without departing from the scope of the invention as indicated by the appended claims.

What I claim is:—

1. A brick machine having a table adapted to support a series of brick molds, in combination with a pair of supporting members arranged above the ends of said table and adapted to support a pile of pallets, and means for ejecting the lowermost pallet from said supporting members in the longitudinal direction of said pallet.

2. A brick machine having a table adapted to support a series of brick molds, in combination with a pair of supporting members arranged above the ends of said table and adapted to support a pile of pallets lengthwise of said table, slides mounted on said supporting members and movable longitudinally of said table whereby to engage the ends of the lowermost pallet and displace it longitudinally from the supporting members, and means for oscillating said slides.

3. A brick machine having a table adapted to support a series of brick molds, in combination with a pair of supporting members arranged above the ends of said table and adapted to support a pile of pallets lengthwise of said table, slides mounted on said supporting members and movable longitudinally of said table whereby to engage the ends of the lowermost pallet and displace it longitudinally from the supporting members, a bar joining said slides whereby they may be moved in unison, and means for oscillating said slides.

4. A brick machine having a table adapted to support a series of brick molds, in combination with a pair of supporting members arranged above the ends of said table and adapted to support a pile of pallets lengthwise of said table, slides mounted on said supporting members and movable longitudinally of said table whereby to engage the ends of the lowermost pallet and displace it longitudinally from the supporting members, means for oscillating said slides, and relatively hard members secured to said supporting members at the edges of said slides for guiding the same.

5. A brick machine having a table adapted to support a series of brick molds, in combination with a pair of supporting members arranged above the ends of said table and adapted to support a pile of pallets lengthwise of said table, slides mounted on said supporting members and movable longitudinally of said table whereby to engage the ends of the lowermost pallet and displace it longitudinally from the supporting members, a bar joining said slides whereby they may be moved in unison, means for oscillating said slides, and relatively hard members secured to said supporting members at the edges of said slides for guiding the same.

6. A brick machine having a table adapted to support a series of brick molds, a pair of bars fixed to the frame of said machine and extending parallel to the edges of said table, brackets secured to said bars, supporting members fixed to said brackets and lying parallel to the edges of said table and spaced therefrom, pallets on said supporting members and lying lengthwise of said table, and ejecting means mounted on said supporting members and adapted to engage the ends of said pallets.

7. A brick machine having a table adapted to support a series of brick molds, a pair of bars fixed to the frame of said machine and extending parallel to the edges of said table, brackets secured to said bars, supporting members fixed to said brackets and lying parallel to the edges of said table and spaced therefrom, pallets on said supporting members and lying lengthwise of said table, slides mounted on said supporting members and adapted to engage the ends of said pallets, and means for oscillating said slides.

8. A brick machine having a table adapted to support a series of brick molds, a pair of bars fixed to the frame of said machine and extending parallel to the edges of said table, brackets secured to said bars, supporting members fixed to said brackets and lying parallel to the edges of said table and spaced therefrom, pallets on said supporting members and lying lengthwise of said table, slides mounted on said supporting members and adapted to engage the ends of said pallets, a bar joining said slides whereby they may be moved in unison, and means for oscillating said slides.

9. A brick machine having a table adapted to support a series of brick molds, a pair of bars fixed to the frame of said machine and extending parallel to the edges of said table, brackets secured to said bars, supporting members fixed to said brackets and lying parallel to the edges of said table and spaced therefrom, pallets on said supporting members and lying lengthwise of said table, slides mounted on said supporting members and adapted to engage the ends of said pallets, and relatively hard members secured to said supporting members at the edges of said slides for guiding the same.

10. A brick machine having a table adapted to support a series of brick molds, in combination with a pair of supporting members arranged above the ends of said table and adapted to support a pile of pallets, slides mounted on said supporting members and movable transversely thereof whereby to engage the ends of the lowermost pallet and displace it from the supporting members, means for oscillating said slides, and spacing members fixedly mounted over said slides at a distance considerably greater than the thickness of a pallet and less than twice the thickness of a pallet.

11. A brick machine having a table adapted to support a series of brick molds, in combination with a pair of supporting members arranged above the ends of said table and adapted to support a pile of pallets, slides mounted on said supporting members and movable transversely thereof whereby to engage the ends of the lowermost pallet and displace it from the supporting members, means for oscillating said slides, relatively hard members secured to said supporting members at the edges of said slides for guiding the same, and spacing members fixedly mounted over said slides at a distance considerably greater than the thickness of a pallet and less than twice the thickness of a pallet.

12. A brick machine having a table adapted to support a series of brick molds, a pair of bars fixed to the frame of said machine and extending parallel to the edges of said table, brackets secured to said bars, supporting members fixed to said brackets and lying parallel to the edges of said table and spaced therefrom, slides mounted on said supporting members and adapted to pass the inner edges thereof, a bar joining said slides whereby they may be moved in unison, means for oscillating said slides, and spacing members fixedly mounted over said slides at a distance considerably greater than the thickness of a pallet and less than twice the thickness of a pallet.

13. A brick machine having a table adapted to support a series of brick molds, in combination with a pair of supporting members arranged above the ends of said table and transversely thereof and adapted to support a pile of pallets, means for ejecting the lowermost pallet from said supporting members in the longitudinal direction of the table, and spacing means associated with said supporting members for receiving the ends of the lowermost pallet during ejection.

In testimony whereof I affix my signature.

HARRY W. BRAINERD.